United States Patent
Xie et al.

(10) Patent No.: US 9,069,216 B2
(45) Date of Patent: Jun. 30, 2015

(54) LIQUID CRYSTAL GRATING MODULE AND TWO DIMENSION-THREE DIMENSION SWITCHABLE LIQUID CRYSTAL DISPLAY DEVICE USING THE SAME

(75) Inventors: Jia Xie, Shenzhen (CN); Ruigai Chen, Shenzhen (CN); Lei Niu, Shenzhen (CN); Xiaoping Sun, Shenzhen (CN); Hui Huang, Shenzhen (CN)

(73) Assignee: TIANMA MICRO-ELECTRONIC CO., LTD., Shenzhen (CN)

( * ) Notice: Subject to any disclaimer, the term of this patent is extended or adjusted under 35 U.S.C. 154(b) by 56 days.

(21) Appl. No.: 13/643,445

(22) PCT Filed: Nov. 9, 2010

(86) PCT No.: PCT/CN2010/078579
§ 371 (c)(1),
(2), (4) Date: Dec. 4, 2012

(87) PCT Pub. No.: WO2011/147162
PCT Pub. Date: Dec. 1, 2011

(65) Prior Publication Data
US 2013/0077037 A1    Mar. 28, 2013

(30) Foreign Application Priority Data
May 26, 2010    (CN) .......................... 2010 1 0184050

(51) Int. Cl.
*G02F 1/1343*    (2006.01)
*G02B 27/22*    (2006.01)

(52) U.S. Cl.
CPC .......... *G02F 1/1343* (2013.01); *G02F 1/13439* (2013.01); *G02B 27/2214* (2013.01)

(58) Field of Classification Search
CPC .. G02B 27/22; G02B 27/2214; G02F 1/1343; G02F 1/134309; G02F 1/1313; G02F 1/134363; H04N 13/04; H04N 13/0409; H04N 13/0411; H04N 13/0413
USPC .................. 349/15, 139, 193, 200, 201, 202, 349/141–143; 359/462, 463, 464; 345/6; 348/54, 59
See application file for complete search history.

(56) References Cited

U.S. PATENT DOCUMENTS 7,453,529 B2 * 11/2008 Nam et al. ...................... 349/15
2007/0115230 A1 * 5/2007 Tajiri et al. ..................... 345/87
2010/0157181 A1 * 6/2010 Takahashi ....................... 349/33

* cited by examiner

*Primary Examiner* — Dung Nguyen
*Assistant Examiner* — Tai Duong
(74) *Attorney, Agent, or Firm* — Steptoe & Johnson LLP

(57) ABSTRACT

A liquid crystal grating module (3) and a two dimension-three dimension switchable liquid crystal display device using the same. The liquid crystal grating module (3) comprises a first transparent electrode layer (20) and a second transparent electrode layer (50). The first transparent electrode layer (20) and the second transparent electrode layer (50) are provided with interval. The first transparent electrode layer (20) comprises a plurality of lateral electrode bars (202,204). The second transparent electrode layer (50) comprises a plurality of vertical electrode bars (502,504). The lateral electrode bars (202,204) and the vertical electrode bars (502,504) are alternately superposed on each other with interval to form a grating structure. The vertical electrode bars (502,504) have three different widths in the direction vertical to the liquid crystal display pixels.

19 Claims, 6 Drawing Sheets

LIQUID CRYSTAL GRATING MODULE AND TWO DIMENSION-THREE DIMENSION SWITCHABLE LIQUID CRYSTAL DISPLAY DEVICE USING THE SAME

CLAIM FOR PRIORITY

This application claims priority under 35 USC 371 to International Application No. PCT/CN2010/078579, filed on Nov. 9, 2010, which claims priority to Chinese Application No. 201010184050.1, filed May 26, 2010, each of which is hereby incorporated by reference in its entirety.

FIELD OF THE INVENTION

The invention relates to a liquid crystal grating module and a two dimension-three dimension (2D/3D) switchable liquid crystal display (LCD) device using the same.

BACKGROUND OF THE INVENTION

Real world, a three-dimensional world, provides human eyes with two images of phase differences, and the parallax required for the three-dimension vision gets formed once the images come into human eyes, whereby the three-dimensional and stereoscopic perception may be produced through the fusion reflection from optic nerve center and visual psychological reaction. Based on this principle, the stereoscopic perception can be obtained when a display device presents two images—a left image and a right image—with phase differences to a left eye and a right eye respectively.

An auto three-dimensional liquid crystal display that is capable of switching between the modes of two dimension and three dimension appeared with the continuous development of three-dimensional display technology, which is referred to as the parallax barrier technology. To realize the technology, a switching liquid crystal screen, a polarizing film and a liquid crystal layer of polymers are needed, and a sequence of vertical stripes perpendicular in the direction of optical rotation are produced with the liquid crystal layer and a layer of the polarizing film. When light goes through the stripes with width of dozens of microns, a vertical thin stripe grating mode, namely "parallax barrier", gets formed. In the three-dimensional displaying mode, it is the parallax barrier that determines which pixels on the liquid crystal screen to be perceived by which eye. Nontransparent stripes may obstruct the right eye, when the images for the left eye are presented on the liquid crystal screen; similarly, nontransparent stripes may obstruct the left eye when the images for the right eye are presented thereon. Turning off the liquid crystal switch, the display may become an ordinary two-dimensional one.

However, problems still exist in the above mentioned auto three-dimensional liquid crystal display: three-dimensional images can be perceived only if the line connecting both eyes is perpendicular to the direction of the stripes so as to coincide with the principle of parallax barrier, while it is not in conformity with the principle of parallax barrier if the line connecting both eyes is parallel to the direction of the stripes, and the three-dimensional images cannot be obtained in that case.

DISCLOSURE

Technical Problem

Aiming at the problem that three-dimensional images can only be perceived in only one direction with the two dimension-three dimension switchable liquid crystal display devices in the prior art, this invention provides a liquid crystal grating module that can avoid color cast and can be utilized to perceive three-dimensional images in both vertical and horizontal directions, and provides a two dimension-three dimension switchable liquid crystal display device using the liquid crystal grating module.

Technical Solution

A liquid crystal grating module, applied for two dimension-three dimension switchable liquid crystal display devices, comprises a first transparent electrode layer and a second transparent electrode layer, which are provide with interval; the first transparent electrode layer comprises a plurality of lateral electrode bars, and the second transparent layer comprises a plurality of vertical electrode bars; the lateral electrode bars and the vertical electrode bars are alternately superposed on each other with interval to form grating structure, and the vertical electrode bars have three different widths in the direction vertical to the liquid crystal display pixels.

Advantageously, the vertical electrode bars comprise a first vertical electrode bar having two different widths in the direction vertical to the liquid crystal display pixels.

Advantageously, the vertical electrode bars also comprise a second vertical electrode bar; wherein the first and second electrode bars are arranged alternately with each other.

Advantageously, the first vertical electrode bar is sandwiched between two second vertical electrode bars which are both adjacent to the first vertical electrode bar.

Advantageously, the lateral electrode bars comprise a first lateral electrode bar and a second lateral electrode bar, which are arranged alternately with each other.

Advantageously, the first lateral electrode bar and the second lateral electrode bar are in the shape of comb, and the first lateral electrode bar is sandwiched between two second lateral electrode bars which are both adjacent to the first lateral electrode bar.

Advantageously, the first and second lateral electrode bars comprise two different widths in the direction parallel to the liquid crystal display pixels.

Advantageously, the width of the first lateral electrode bar is larger than that of the second lateral electrode bar.

Advantageously, the liquid crystal grating module further comprises a lateral electrode cable connecting the lateral electrode bars and a vertical electrode cable connecting the vertical electrode bars.

Advantageously, the lateral electrode cable comprises a first lateral electrode cable connecting the first lateral electrode bar in parallel and a second lateral electrode cable connecting the second lateral electrode bar in parallel.

Advantageously, the vertical electrode cable comprises a first vertical electrode cable connecting the first vertical electrode bar in parallel and a second vertical electrode cable connecting the second vertical electrode bar in parallel.

A two dimension-three dimension switchable liquid crystal display device, comprising a liquid crystal display and a liquid crystal grating module arranged on the liquid crystal display; the liquid crystal grating module comprises a first transparent electrode layer and a second transparent electrode layer, which are provide with interval; the first transparent electrode layer comprises a plurality of lateral electrode bars, and the second transparent layer comprises a plurality of vertical electrode bars; the lateral electrode bars and the vertical electrode bars are alternately superposed on each other with interval to form grating structure, and the vertical electrode bars have three different widths in the direction vertical to the liquid crystal display pixels.

Advantageously, the vertical electrode bars comprise a first vertical electrode bar having two different widths in the direction vertical to the liquid crystal display pixels.

Advantageously, the vertical electrode bars also comprise a second vertical electrode bar; wherein the first and second electrode bars are arranged alternately with each other.

Advantageously, the first vertical electrode bar is sandwiched between two second vertical electrode bars which are both adjacent to the first vertical electrode bar.

Advantageously, the lateral electrode bars comprise a first lateral electrode bar and a second lateral electrode bar, which are arranged alternately with each other.

Advantageously, the first lateral electrode bar and the second lateral electrode bar are in the shape of comb, and the first lateral electrode bar is sandwiched between two second lateral electrode bars which are both adjacent to the first lateral electrode bar.

Advantageously, the first and second lateral electrode bars comprise two different widths in the direction parallel to the liquid crystal display pixels.

Advantageously, the width of the first lateral electrode bar is larger than that of the second lateral electrode bar.

Advantageous Effect

In the liquid crystal grating module and the two dimension-three dimension switchable liquid crystal display device using the same of the present invention, the viewer can observe some equal sub-pixel regions in the direction vertical to the pixels of the liquid crystal display so as to avoid color cast, for the vertical electrode bars are provided with three different widths in the direction vertical to the pixels of the liquid crystal display.

DETAILED DESCRIPTION OF THE PREFERRED EMBODIMENT

Below the two dimension-three dimension switchable liquid crystal display device of the present invention will be explained with reference to accompanying drawings.

Figure 1:
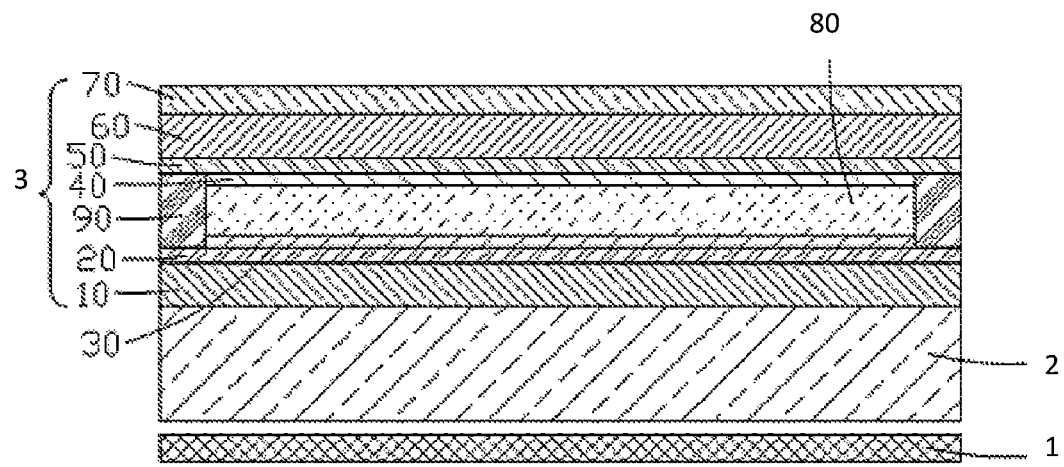
FIG. 1 is a structural schematic diagram of a two dimension-three dimension switchable liquid crystal display device according to a preferred embodiment of the present invention.

Please refer to FIG. 1, it schematically illustrates the structure of a two dimension-three dimension switchable liquid crystal display device described in this invention. The two dimension-three dimension switchable liquid crystal display device comprises a backlight 1, a liquid crystal display 2 and a liquid crystal grating module 3 set on one lateral surface of the liquid crystal display 2. With the aid of the liquid crystal grating module 3, human eyes can perceive three-dimensional images from both the direction horizontal to the liquid crystal display 2 and the direction perpendicular to it, when utilizing the two dimension-three dimension switchable liquid crystal display device.

The liquid crystal grating module 3 comprises a first glass substrate 10, a first transparent electrode layer 20, a first alignment film 30, a second alignment film 40, a second transparent electrode layer 50, a second glass substrate 60, a polarizer 70, a liquid crystal layer 80 and a frame 90.

The first transparent electrode layer 20 gets formed on a lateral surface where the first glass substrate 10 is adjacent to the second glass substrate 60, and the first alignment film 30 gets formed on the first transparent electrode layer 20. The second transparent electrode layer 50 gets formed on a lateral surface where the second glass substrate 60 is adjacent to the first glass substrate 20, and the second alignment film 40 gets formed on the second transparent electrode layer 50. The frame 90 is located between the first transparent electrode layer 20 and the second transparent electrode layer 50, while the liquid crystal layer 80 is contained in an enclosed space formed by the frame, the first alignment film 30 and the second alignment film 40.

Figure 2:
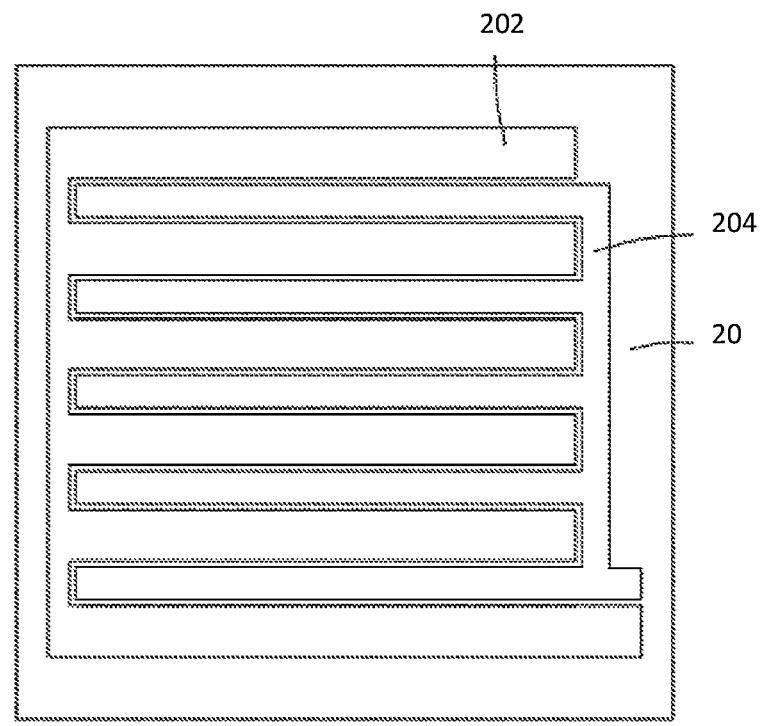
FIG. 2 is a plan view of a first transparent electrode layer in the liquid crystal grating module described in FIG. 1.

Please refer to FIG. 2, it schematically illustrates the structure of the first transparent electrode layer 20. The first transparent electrode layer 20 comprises a first lateral electrode bar 202 and a second lateral electrode bar 204 both in the shape of comb, which two are formed on the first transparent electrode layer 20 alternately with each other, i.e. the second lateral electrode bar 204 is sandwiched between every two nearby first lateral electrode bars 202, and in the same way, the first lateral electrode bar 202 is sandwiched between every two nearby second lateral electrode bars 204. The first lateral electrode bar 202 is set at the outermost side of the second lateral electrode bar 204, and the second lateral electrode bar 204 is set at the inner side of the first lateral electrode bar 202; herein, some interval exists between the second lateral electrode bar 204 and the first lateral electrode bar 202. The widths of the first and second lateral electrode bars 202 and 204 are set to be d and e respectively, wherein d is larger than e. The gap width between the second lateral electrode bar 204 and the first lateral electrode bar 202 is far smaller than e.

Figure 3:
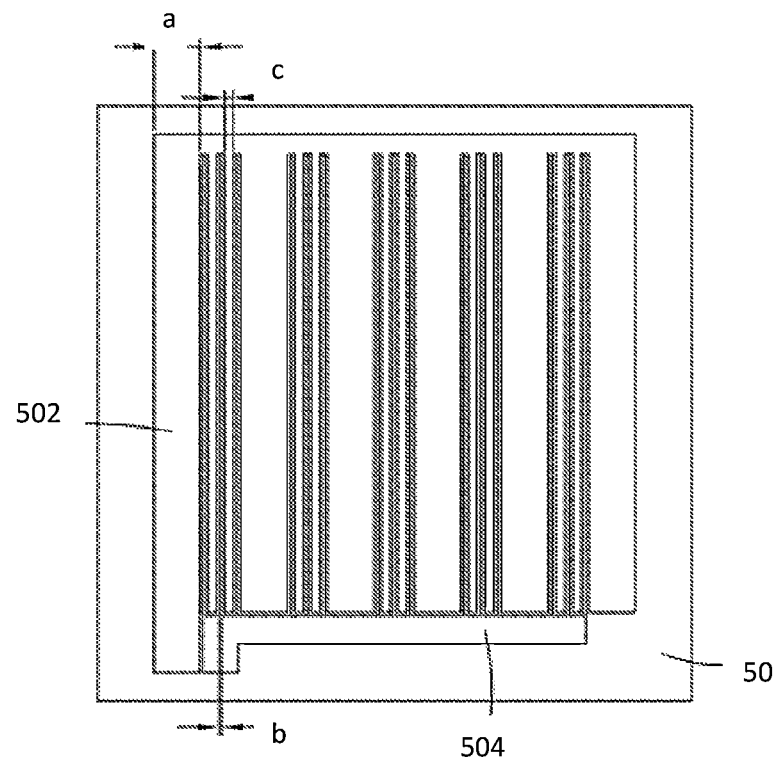
FIG. 3 is a plan view of a second transparent electrode layer in the liquid crystal grating module described in FIG. 1.

Please refer to FIG. 3, it schematically illustrates the structure of the second transparent electrode layer 50. The second transparent electrode layer 50 comprises a first vertical electrode bar 502 and a second vertical electrode bar 504 both in the shape of comb, which two are formed on the second transparent electrode layer 50 alternately with each other, i.e. the second vertical electrode bar 504 is sandwiched between every two nearby first vertical electrode bars 502, and in the same way, the first vertical electrode bar 502 is sandwiched between every two nearby second vertical electrode bars 504. The first vertical electrode bar 502 is set at the outermost side of the second vertical electrode bar 504, and the second vertical electrode bar 504 is set at the inner side of the first vertical electrode bar 502. The first vertical electrode bar 502 and the second vertical electrode bar 504 are set separately corresponding to the sub-pixels of the liquid crystal display 2. According to FIG. 4, the first vertical electrode bar 502 is set with three different widths, a, b and c from left to right, wherein, c is smaller than a. The width of the second vertical electrode bar 504 is set as b, and b is smaller than a. The widths, a, b, and c, are not equal with each other, i.e. the first vertical electrode bar 502 and the second vertical electrode bar 504 have three different widths, a, b, and c, in the direction vertical to the pixels of the liquid crystal display 2. The first and second lateral electrode bars 202 and 204 as well as the first and second vertical electrode bars 502 and 504 are alternately superposed on each other with interval to form a grating structure.

Figure 4:
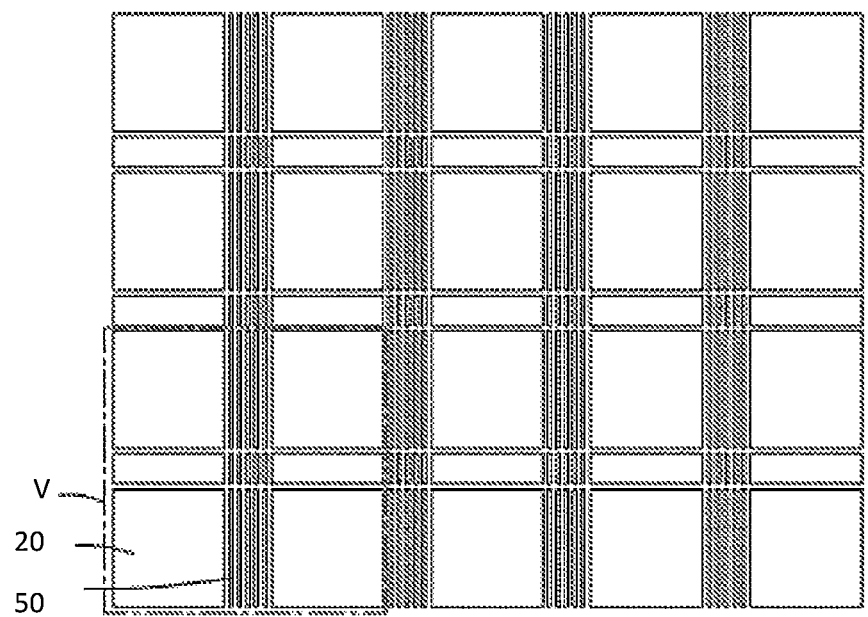
FIG. 4 is a schematic diagram for a displayed pattern of the liquid crystal grating module.
Figure 5:
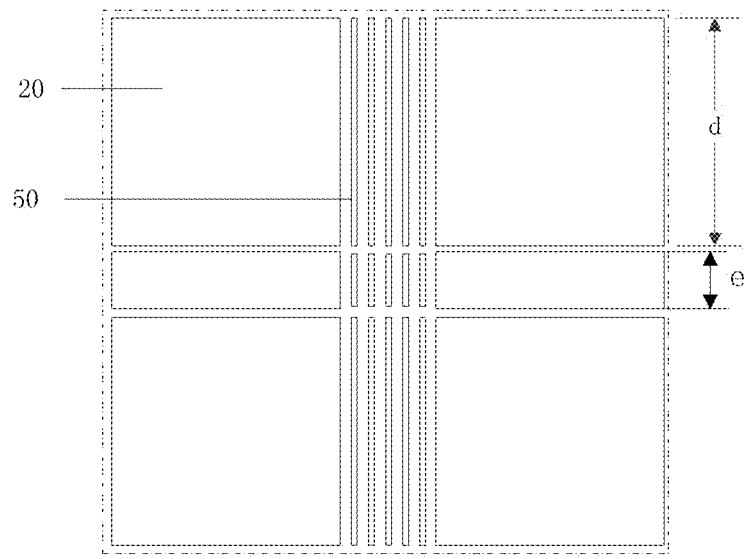
FIG. 5 is a partial enlarged view of part V in dotted line in FIG. 4.

Please refer to FIGS. 4 and 5, wherein, FIG. 4 is a schematic diagram for a displayed pattern of the liquid crystal grating module 3, and FIG. 5 is a partial enlarged view of part V in dotted line in FIG. 4. In the liquid crystal grating module 3, the first transparent electrode layer 20 and the second transparent electrode layer 50 are alternately superposed on each other with interval to form a mesh arrangement, i.e., three widths, a, b, and c, are set on the horizontal direction, and two widths, d and e, are set on the vertical direction.

Figure 6:
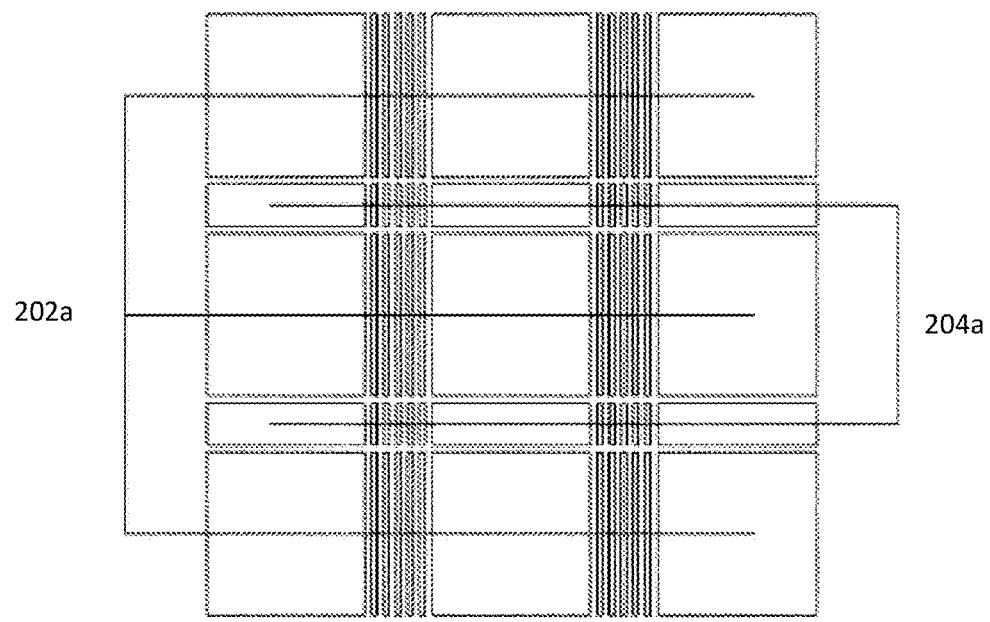
FIG. 6 is a wiring schematic diagram of lateral electrode cables in the liquid crystal grating module.

Please refer to FIG. 6, the liquid crystal grating module 3 further comprises a first lateral electrode cable 202*a* and a second lateral electrode cable 204*a*. The first lateral electrode cable 202*a* connects the first lateral electrode bar 202 located on the outer side of the first transparent electrode layer 20 in parallel, while the second lateral electrode cable 202*a* connects the second lateral electrode bar 204 located on the inner side of the first transparent electrode layer 20 in parallel.

Figure 7:
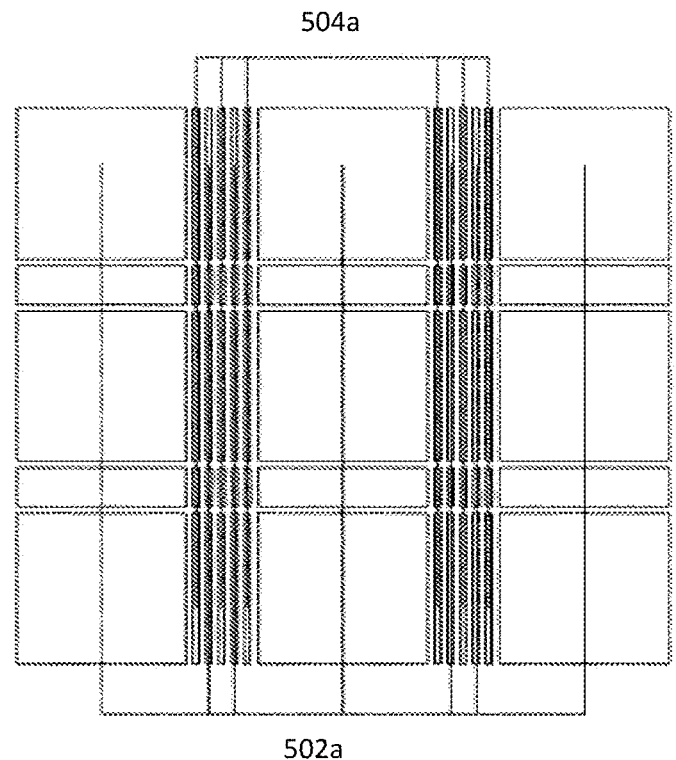
FIG. 7 is a wiring schematic diagram of vertical electrode cables in the liquid crystal grating module.

Please refer to FIG. 7, the liquid crystal grating module 3 further comprises a first vertical electrode cable 502*a* and a second vertical electrode cable 504*a*. The first vertical electrode cable 502*a* connects the first vertical electrode bar 502 located on the outer side of the second transparent electrode layer 50 in parallel, while the second vertical electrode cable 504*a* connects the second vertical electrode bar 504 located on the inner side of the second transparent electrode layer 50 in parallel.

Figure 8:
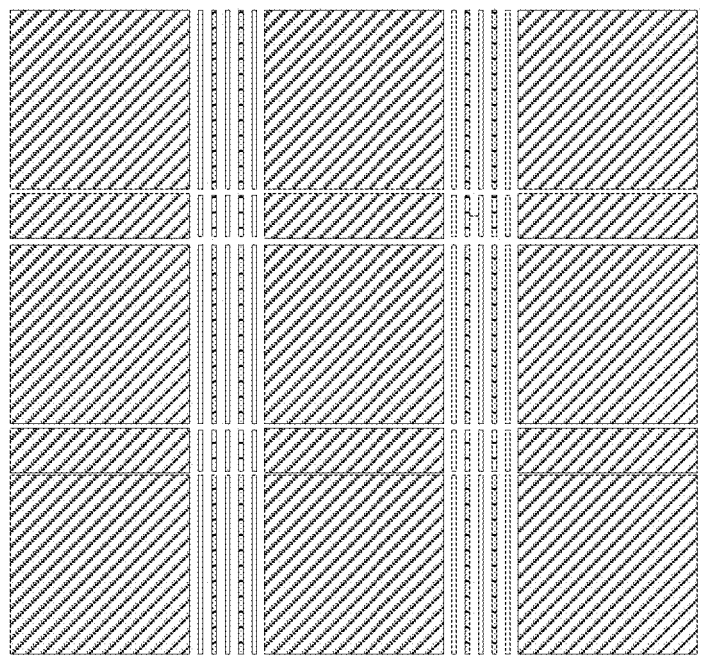
FIG. 8 schematically illustrates the displaying state of the liquid crystal grating module in the vertical direction of the pixels of the two dimension-three dimension switchable liquid crystal display device.

Please refer to FIG. 8, it is a schematic diagram of the displaying state of the liquid crystal grating module in the direction vertical to the two dimension-three dimension switchable display device pixels. The displaying state of the liquid crystal grating module 3 is as shown in FIG. 8, when a driving voltage is exerted to the first lateral electrode bar 202, the second lateral electrode bar 204 and the first vertical electrode bar 502.

Figure 9:
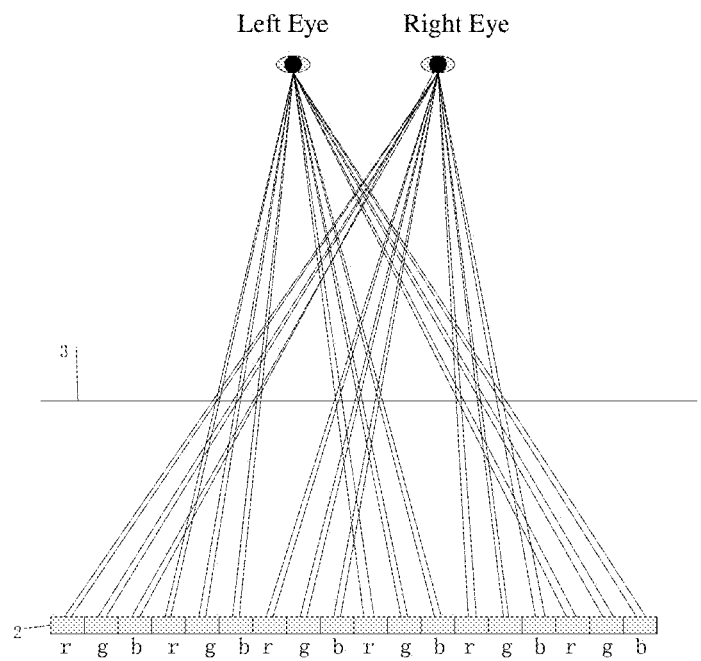
FIG. 9 is a schematic diagram for the obstruction of the liquid crystal grating module in the direction of FIG. 8.
Figure 10:
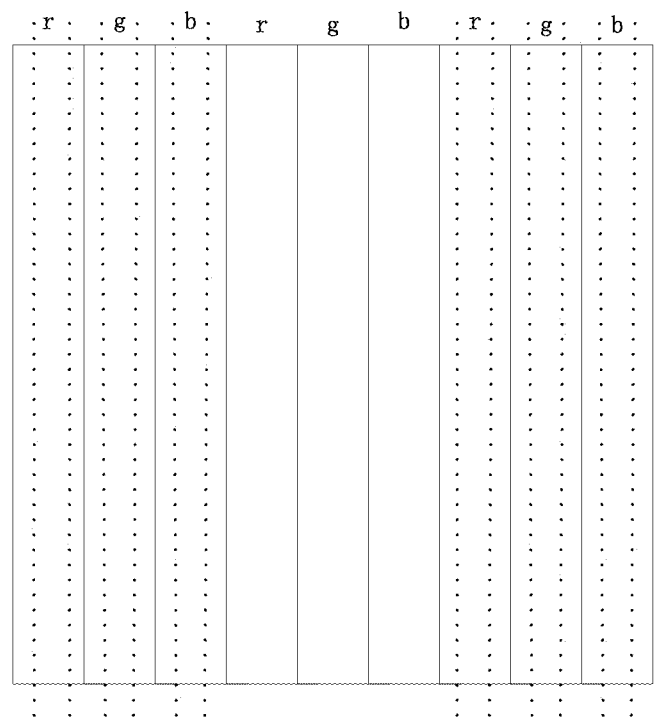
FIG. 10 schematically illustrates the pixel region perceived by one eye of the viewer.

Please refer to FIGS. 9 and 10, wherein FIG. 9 is a schematic diagram for the obstruction of the liquid crystal grating module 3 in the direction shown in FIG. 8, and FIG. 10 schematically shows the pixel region of the liquid crystal display 2 from one eye of viewer shown in FIG. 9. According to FIG. 10, the viewer can obtain some equal sub-pixel region in the direction vertical to the liquid crystal display pixels so as to avoid color cast.

Figure 11:
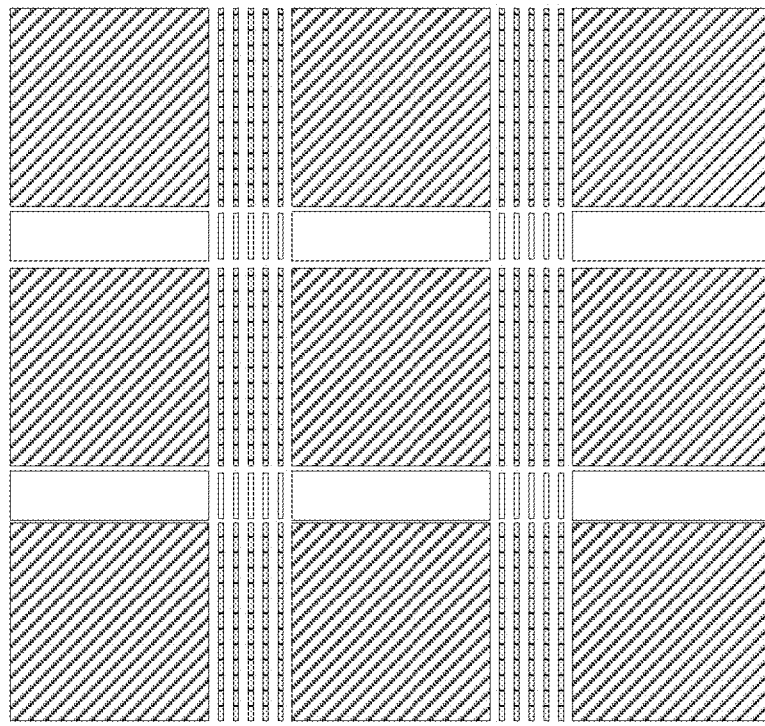
FIG. 11 is schematic diagram of the displaying state of the liquid crystal grating module in the horizontal direction of the pixels of the two dimension-three dimension switchable display device.
Figure 12:
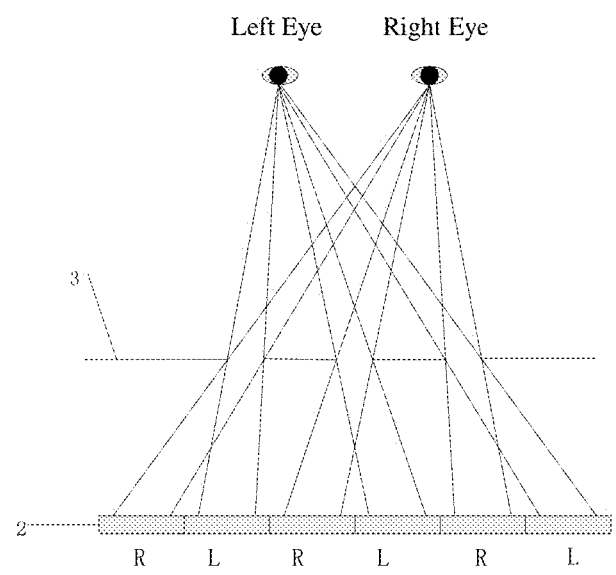
FIG. 12 is a schematic diagram of the obstruction of the liquid crystal grating module in the direction of FIG. 11.

FIG. 11 schematically illustrates the displaying state of the liquid crystal grating module 3 in the horizontal direction of the two dimension-three dimension switchable display device pixels. The schematic diagram for the displaying state of the liquid crystal grating module 3 as shown in FIG. 11 can be obtained, when a driving voltage is exerted to the first and second vertical electrode bars 502 and 504 of the second transparent electrode layer 50 and the first lateral electrode bar 202 of the first transparent electrode layer 20. FIG. 12 is a schematic diagram of the obstruction of the liquid crystal grating module 3 in the direction shown in FIG. 11.

When the two dimension-three dimension switchable liquid crystal display device is working, for the need of three-dimensional displaying, light transmits through the liquid crystal grating module 3 and parallax gets formed by exerting high-low impulse voltages to the first transparent electrode layer 20 and the second transparent electrode layer 50; for the need of two-dimensional displaying, the liquid crystal grating module 3 becomes transparent and the parallax cannot get formed on the liquid crystal display 2 by ceasing exerting the impulse voltages to the first transparent electrode layer 20 and the second transparent electrode layer 50, in which case the two dimension-three dimension switchable liquid crystal display device can present the two-dimensional displaying.

In the liquid crystal grating module 3 of the present invention, the viewer can observe some equal sub-pixel regions in the direction vertical to the pixels of the liquid crystal display 2 so as to avoid color cast, for the first vertical electrode bar 502 and the second vertical electrode bar 504 are provided with three different widths that are arranged corresponding to the sub-pixels in the direction vertical to the pixels of the liquid crystal display.

To sum up, the liquid crystal grating module 3 and the two dimension-three dimension switchable liquid crystal display device using the same of the present invention can provide three-dimensional images perceived from two directions, and can avoid color cast efficiently.

The above embodiments just show preferred implementations of the present invention, while they are not considered to limit the present invention. Various changes and modifications can be made to this invention for those skills in the art. All of any modifications, equivalents and improvement within the spirit and principle of the present invention should be included in the scope of protection of the present invention.

The invention claimed is:

1. A liquid crystal grating module applied for two dimension-three dimension switchable liquid crystal display devices, wherein the liquid crystal grating module comprises a first transparent electrode layer and a second transparent electrode layer, which are provided with interval; the liquid crystal grating module further comprises
    a liquid crystal layer between the first transparent electrode layer and the second transparent electrode layer;
    a first alignment film formed on the first transparent electrode layer; and
    a second alignment film formed on the second transparent electrode layer;
    wherein the first alignment film is sandwiched between the first transparent electrode layer and the liquid crystal layer, and the second alignment film is sandwiched between the second transparent electrode layer and the liquid crystal layer; the first transparent electrode layer comprises a plurality of lateral electrode bars, and the second transparent layer comprises a plurality of vertical electrode bars; the lateral electrode bars and the vertical electrode bars are alternately superposed on each other with interval to form grating structure, and the vertical electrode bars have three different widths in a direction vertical to liquid crystal display pixels.

2. The liquid crystal grating module of claim 1, wherein, the vertical electrode bars comprise a first vertical electrode bar having two different widths in the direction vertical to the liquid crystal display pixels.

3. The liquid crystal grating module of claim 2, wherein, the vertical electrode bars also comprise a second vertical electrode bar; wherein the first and second electrode bars are arranged alternately with each other.

4. The liquid crystal grating module of claim 3, wherein, the first vertical electrode bar is sandwiched between two second vertical electrode bars which are both adjacent to the first vertical electrode bar.

5. The liquid crystal grating module of claim 4, wherein, the lateral electrode bars comprise a first lateral electrode bar and a second lateral electrode bar, which are arranged alternately with each other.

6. The liquid crystal grating module of claim 5, wherein, the first lateral electrode bar and the second lateral electrode bar are in the shape of comb, and the first lateral electrode bar is sandwiched between two second lateral electrode bars which are both adjacent to the first lateral electrode bar.

7. The liquid crystal grating module of claim 6, wherein, the first and second lateral electrode bars comprise two different widths in the direction parallel to the liquid crystal display pixels.

8. The liquid crystal grating module of claim 7, wherein, the width of the first lateral electrode bar is larger than that of the second lateral electrode bar.

9. The liquid crystal grating module of claim 5, wherein, the liquid crystal grating module further comprises a lateral electrode cable connecting the lateral electrode bars and a vertical electrode cable connecting the vertical electrode bars.

10. The liquid crystal grating module of claim 9, wherein, the lateral electrode cable comprises a first lateral electrode cable connecting the first lateral electrode bar in parallel and a second lateral electrode cable connecting the second lateral electrode bar in parallel.

11. The liquid crystal grating module of claim 9, wherein, the vertical electrode cable comprises a first vertical electrode cable connecting the first vertical electrode bar in parallel and a second vertical electrode cable connecting the second vertical electrode bar in parallel.

12. A two dimension-three dimension switchable liquid crystal display device, comprising a liquid crystal display and a liquid crystal grating module arranged on the liquid crystal display; wherein the liquid crystal grating module comprises a first transparent electrode layer and a second transparent electrode layer, which are provided with interval; the liquid crystal grating module further comprises a liquid crystal layer between the first transparent electrode layer and the second transparent electrode layer;
a first alignment film formed on the first transparent electrode layer; and
a second alignment film formed on the second transparent electrode layer;
wherein the first alignment film is sandwiched between the first transparent electrode layer and the liquid crystal layer, and the second alignment film is sandwiched between the second transparent electrode layer and the liquid crystal layer; the first transparent electrode layer comprises a plurality of lateral electrode bars, and the second transparent layer comprises a plurality of vertical electrode bars; the lateral electrode bars and the vertical electrode bars are alternately superposed on each other with interval to form grating structure, and the vertical electrode bars have three different widths in a direction vertical to liquid crystal display pixels.

13. The two dimension-three dimension switchable liquid crystal display device of claim 12, wherein, the vertical electrode bars comprise a first vertical electrode bar having two different widths in the direction vertical to the liquid crystal display pixels.

14. The two dimension-three dimension switchable liquid crystal display device of claim 13, wherein, the vertical electrode bars also comprise a second vertical electrode bar; wherein the first and second vertical electrode bars are arranged alternately with each other.

15. The two dimension-three dimension switchable liquid crystal display device of claim 14, wherein, the first vertical electrode bar is sandwiched between two second vertical electrode bars which are both adjacent to the first vertical electrode bar.

16. The two dimension-three dimension switchable liquid crystal display device of claim 12, wherein, the lateral electrode bars comprise a first lateral electrode bar and a second lateral electrode bar, which are arranged alternately with each other.

17. The two dimension-three dimension switchable liquid crystal display device of claim 16, wherein, the first lateral electrode bar and the second lateral electrode bar are in the shape of comb, and the first lateral electrode bar is sandwiched between two second lateral electrode bars which are both adjacent to the first lateral electrode bar.

18. The two dimension-three dimension switchable liquid crystal display device of claim 16, wherein, the first and second lateral electrode bars comprise two different widths in the direction parallel to the liquid crystal display pixels.

19. The two dimension-three dimension switchable liquid crystal display device of claim 18, wherein, the width of the first lateral electrode bar is larger than that of the second lateral electrode bar.

* * * * *